(12) United States Patent
Thomas

(10) Patent No.: US 8,307,012 B2
(45) Date of Patent: Nov. 6, 2012

(54) SCHEMA MAPPING AND DATA TRANSFORMATION ON THE BASIS OF A CONCEPTUAL MODEL

(75) Inventor: Susan Marie Thomas, Karisruhe (DE)

(73) Assignee: SAP AG, Walldorf (DE)

( * ) Notice: Subject to any disclaimer, the term of this patent is extended or adjusted under 35 U.S.C. 154(b) by 1404 days.

(21) Appl. No.: 11/363,239

(22) Filed: Feb. 28, 2006

(65) Prior Publication Data
US 2007/0203923 A1 Aug. 30, 2007

(51) Int. Cl.
G06F 17/30 (2006.01)
G06F 17/00 (2006.01)
(52) U.S. Cl. ........ 707/803; 707/804; 707/805; 707/806; 707/807; 707/808; 707/809; 707/810
(58) Field of Classification Search .......... 707/100–102, 707/803–810
See application file for complete search history.

(56) References Cited

U.S. PATENT DOCUMENTS

| | | | |
|---|---|---|---|
| 5,627,979 A | 5/1997 | Chang et al. | |
| 5,767,854 A | 6/1998 | Anwar | |
| 6,460,043 B1 * | 10/2002 | Tabbara et al. | 707/100 |
| 6,490,581 B1 | 12/2002 | Neshatfar et al. | |
| 6,718,320 B1 | 4/2004 | Subramanian et al. | |
| 6,785,689 B1 * | 8/2004 | Daniel et al. | 707/102 |
| 7,149,746 B2 | 12/2006 | Fagin et al. | |
| 2003/0088639 A1 | 5/2003 | Lentini et al. | |
| 2003/0149934 A1 | 8/2003 | Worden | |
| 2003/0217069 A1 | 11/2003 | Fagin et al. | |
| 2004/0199905 A1 | 10/2004 | Fagin et al. | |

OTHER PUBLICATIONS

Hong-Hai Do et al., "COMA—A System for Flexible Combination of Schema Matching Approaches," Proceedings of the 28th VLDB Conference, Hong Kong, China (2002) (12 pages).
"XML Schema Mapping", Stylus Studio, 2005, http://stylusstudio.com/xml_schema_mapper_screenshot.html. (2 pages).
"UN/EDIFACT to XML Schema Mapping", Altova, 2005, http://www.altova.com/manual2006/mapforce/mapforce-enterprise/mf-funedifacttoxmlschemamappi.htm. (9 pages).
U.S. Appl. No. 11/363,234, filed Feb. 28, 2006, entitled "Schema Mapping and Data Transformation on the Basis of Layout and Content."

* cited by examiner

*Primary Examiner* — Yicun Wu
(74) *Attorney, Agent, or Firm* — Finnegan, Henderson, Farabow, Garrett & Dunner LLP

(57) ABSTRACT

Systems and methods are provided for schema mapping and the transformation of data. In accordance with one implementation, a computer-implemented method is provided that comprises loading a conceptual model, wherein the conceptual model contains at least one conceptual object, loading a source schema and a source instance, converting the source schema and the source instance into a source model, and acquiring, from the user, at least one forward mapping usable to map at least a source attribute of the source model to a conceptual attribute of the conceptual model, wherein the forward mapping includes a mapping formula. Further, the method may include loading a target schema and a target instance, converting the target schema and the target instance into a target model, and reverse mapping at least one of conceptual attributes of the conceptual model to a target attribute of the target model based on the forward mapping and the mapping formula.

27 Claims, 10 Drawing Sheets

```
<xsd:schema xmlns:xsd="http://www.w3.org/2001/XMLSchema">

<xsd:annotation>
  <xsd:documentation xml:lang="en">
   Sample source schema
  </xsd:documentation>
</xsd:annotation>

<xsd:element name="purchaseOrder" type="PurchaseOrderType"/>

<xsd:element name="comment" type="xsd:string"/>

<xsd:complexType name="PurchaseOrderType">
  <xsd:sequence>
    <xsd:element name="shipTo" type="USAddress"/>
    <xsd:element name="billTo" type="USAddress"/>
    <xsd:element ref="comment" minOccurs="0"/>
    <xsd:element name="items"  type="Items"/>
  </xsd:sequence>
  <xsd:attribute name="orderID" type="xsd:decimal"/>
  <xsd:attribute name="orderDate" type="xsd:date"/>
</xsd:complexType>

<xsd:complexType name="USAddress">
  <xsd:sequence>
    <xsd:element name="name"   type="xsd:string"/>
    <xsd:element name="street" type="xsd:string"/>
    <xsd:element name="city"   type="xsd:string"/>
    <xsd:element name="state"  type="xsd:string"/>
    <xsd:element name="zip"    type="xsd:decimal"/>
  </xsd:sequence>
  <xsd:attribute name="country" type="xsd:NMTOKEN"
           fixed="US"/>
</xsd:complexType>

<xsd:complexType name="Items">
  <xsd:sequence>
    <xsd:element name="item" minOccurs="0" maxOccurs="unbounded">
      <xsd:complexType>
        <xsd:sequence>
          <xsd:element name="productName" type="xsd:string"/>
          <xsd:element name="quantity">
            <xsd:simpleType>
              <xsd:restriction base="xsd:positiveInteger">
                <xsd:maxExclusive value="100"/>
              </xsd:restriction>
            </xsd:simpleType>
          </xsd:element>
          <xsd:element name="USPrice"  type="xsd:decimal"/>
          <xsd:element ref="comment"   minOccurs="0"/>
          <xsd:element name="shipDate" type="xsd:date" minOccurs="0"/>
        </xsd:sequence>
        <xsd:attribute name="partNum" type="SKU" use="required"/>
      </xsd:complexType>
    </xsd:element>
  </xsd:sequence>
</xsd:complexType>

</xsd:schema>
```

```xml
<?xml version="1.0" encoding="UTF-8"?>
<xsd:schema xmlns:xsd="http://www.w3.org/2001/XMLSchema">
<xsd:annotation>
   <xsd:documentation xml:lang="DE">
      Sample target schema
   </xsd:documentation>
</xsd:annotation>

<xsd:element name="Bestellung" type="BestellungTyp"/>

<xsd:element name="Kommentar" type="xsd:string"/>

<xsd:complexType name="BestellungTyp">
   <xsd:sequence>
      <xsd:element name="Lieferadresse" type="DeAdresse"/>
      <xsd:element name="Rechnungsadresse" type="DeAdresse"/>
      <xsd:element ref="Kommentar" minOccurs="0"/>
      <xsd:element name="Waren" type="WarenTyp"/>
   </xsd:sequence>
   <xsd:attribute name="bestelldatum" type="xsd:date"/>
</xsd:complexType>

<xsd:complexType name="DeAdresse">
   <xsd:sequence>
   <xsd:element name="Name" type="xsd:string"/>
   <xsd:element name="Strasse"  type="xsd:string"/>
   <xsd:element name="Ort" type="xsd:string"/>
   <xsd:element name="PLZ" type="xsd:decimal"/>
   </xsd:sequence>
   <xsd:attribute name="BestellungID" type="xsd:decimal"/>
   <xsd:attribute name="land" type="xsd:NMTOKEN" fixed="DE"/>
</xsd:complexType>

<xsd:complexType name="WarenTyp">
   <xsd:sequence>
   <xsd:element name="Buch" minOccurs="0" maxOccurs="unbounded">
      <xsd:complexType>
         <xsd:sequence>
         <xsd:element name="Titel" type="xsd:string"/>
         <xsd:element name="Anzahl">
            <xsd:simpleType>
               <xsd:restriction base="xsd:positiveInteger">
                  <xsd:maxExclusive value="100"/>
               </xsd:restriction>
            </xsd:simpleType>
         </xsd:element>
         <xsd:element name="PreisEUR" type="xsd:decimal"/>
         <xsd:element ref="Kommentar" minOccurs="0"/>
         <xsd:element name="Lieferdatum" type="xsd:date" minOccurs="0"/>
         </xsd:sequence>
         <xsd:attribute name="ISBN" type="ISBNTyp" use="required"/>
      </xsd:complexType>
   </xsd:element>
   </xsd:sequence>
</xsd:complexType>

<xsd:simpleType name="ISBNTyp">
   <xsd:restriction base="xsd:string">
   <xsd:pattern value="\d{9}[0-9X]"/>
   </xsd:restriction>
</xsd:simpleType>

</xsd:schema>
```

Figure 5B

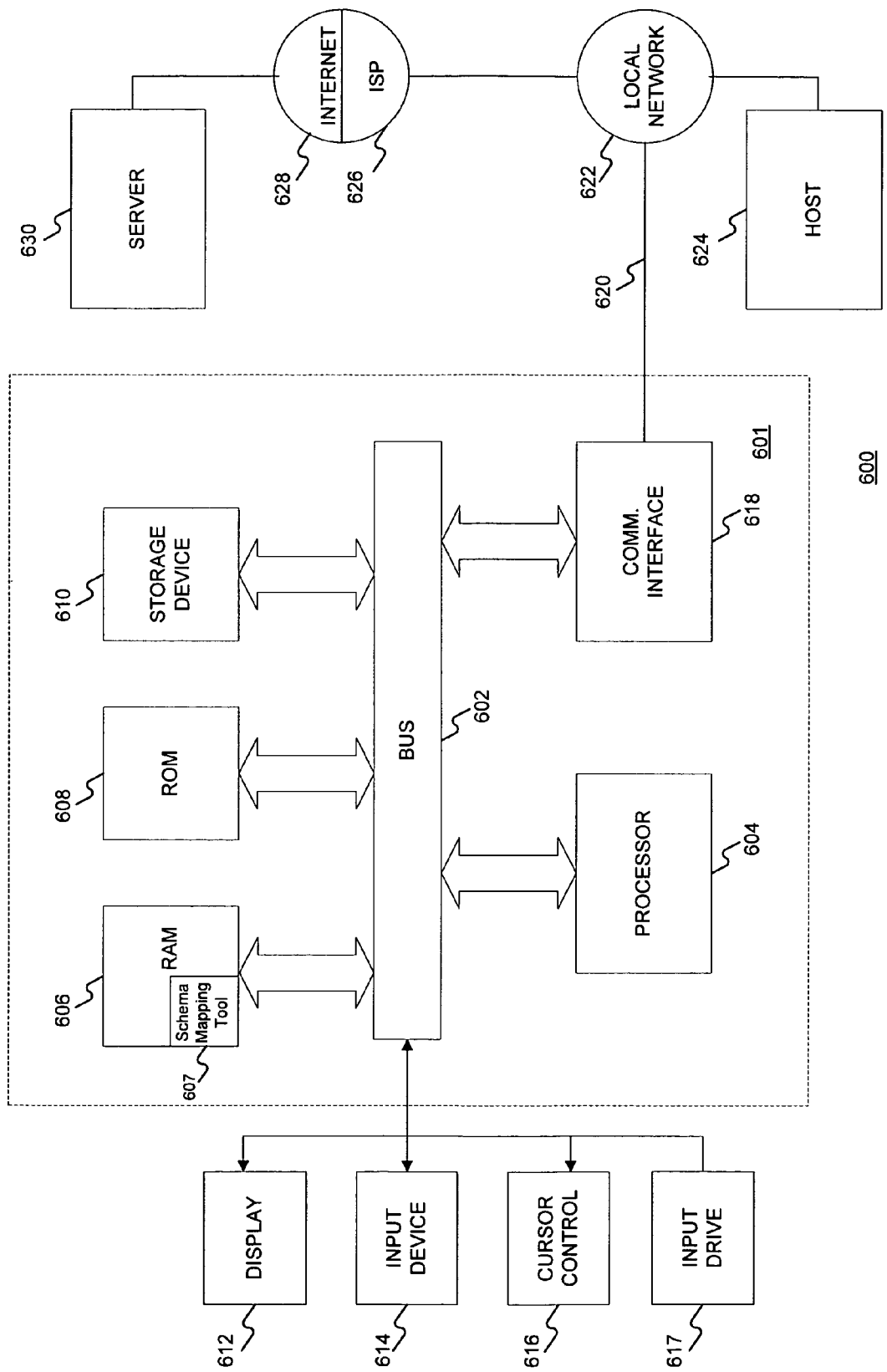

SCHEMA MAPPING AND DATA TRANSFORMATION ON THE BASIS OF A CONCEPTUAL MODEL

TECHNICAL FIELD

The present invention generally relates to the field of data transformation. More particularly, the invention relates to systems and methods for schema mapping and the transformation of data.

BACKGROUND

Businesses, enterprises, and other organizations use databases to store and manage information ranging from inventory, clients, accounts, products, and the like. Moreover, businesses often need to manage and merge data from many different sources, including business partners, data feeds, legacy systems, and the like. The dramatic growth of the Internet and electronic commerce has increased businesses' reliance on the ability to capture, use, and integrate data from multiple sources encoded using different data schemas. Transforming data from one data schema to another requires data mappings between the data source(s) and a data target.

An important issue in modern information systems and electronic commerce applications is providing support for inter-operability of independent data sources. A broad variety of data is available on the Internet in distinct heterogeneous sources, stored under different formats such as: database formats (e.g., relational model), semi-structured formats (e.g., data type definitions, standard generalized markup language, extensible markup language schema), scientific formats, etc. Integration of such data is an increasingly important issue. The effort involved in such integration is considerable. Translation of data from one format or schema to another requires writing and managing complex data transformation programs or queries.

The issue of schema-mapping involves translating data from one independently created schema (e.g., a source schema) to another independently created schema (e.g., a target schema). The schemas may have different semantics, and this may be reflected in differences in their logical structures and constraints. Moreover, the source and target schema may not represent the same data. There may be source data that is not represented in the target, and should thus be omitted in the translation or mapping process. However, there may be a need in the target schema for data not represented in the source schema. In certain cases, values must be produced for undetermined elements or attributes in the target schema, e.g., target elements for which there is no corresponding source element. Values may be needed if the target element can not be null, such as elements in a key, and no default is given. More importantly, the creation of new values for such target elements is essential for ensuring the consistency of the target data.

Presently, tools that facilitate the task of transforming data work at a technical level. For example, there exist mapping tools that provide a user interface (UI) showing the structure of a data schema as a tree of elements used to encode the data. There also exists mapping tools that display trees of elements side-by-side for the two data schemas to be matched, in which the user is able to manually create links between matching elements of the source and target schemas. However, the approaches taken by existing mapping tools are time-consuming to the users and prone to error. Furthermore, these approaches are generally not suitable for a non-technical user for several reasons. For example, the existing approaches do not work with actual data values. Without data values to provide the user with a better understanding of the schema elements, the user is often unsure of how to interpret schema elements. Also, the existing approaches require a debugging cycle. In the existing approaches, the user first creates schema mappings, then invokes a tool to transform an example instance of the schema based on the schema mappings. The user must then manually check that the results of the transformation are correct.

Therefore, there is a need for systems and methods that provide a comprehensive yet straightforward solution to building, refining and managing mappings between heterogeneous schemas.

SUMMARY

Embodiments consistent with the present invention relate to systems and methods for schema mapping and the transformation of data on the basis of, for example, a conceptual model. Embodiments consistent with the invention also relate to systems and methods for schema mapping and data transformation of a source schema to a target schema. Further, as disclosed herein, embodiments of the invention may be computer-implemented through any suitable combination of hardware, software and firmware.

In accordance with an embodiment of the invention, a computer-implemented method is provided that comprises loading a conceptual model, wherein the conceptual model contains at least one conceptual object, loading a source schema and a source instance, converting the source schema and the source instance into a source model, and acquiring, from the user, at least one forward mapping usable to map at least a source attribute of the source model to a conceptual attribute of the conceptual model, wherein the forward mapping includes a mapping formula. Further, the method includes loading a target schema and a target instance, converting the target schema and the target instance into a target model, and reverse mapping at least one of conceptual attributes of the conceptual model to a target attribute of the target model based on the forward mapping and the mapping formula.

Consistent with yet another embodiment of the invention, a computer-readable medium is provided containing instructions for performing a method when the instructions are executed by a processor. The method comprises loading a conceptual model, wherein the conceptual model contains at least one conceptual object, loading a source schema and a source instance, converting the source schema and the source instance into a source model, and acquiring, from the user, at least one forward mapping usable to map at least a source attribute of the source model to a conceptual attribute of the conceptual model, wherein the forward mapping includes a mapping formula. Further, the method includes loading a target schema and a target instance, converting the target schema and the target instance into a target model, and reverse mapping at least one of conceptual attributes of the conceptual model to a target attribute of the target model based on the forward mapping and the mapping formula.

In accordance with another embodiment of the invention, a system is provided that comprises means for loading a conceptual model, wherein the conceptual model contains at least one conceptual object, means for loading a source schema and a source instance, means for converting the source schema and the source instance into a source model, and means for acquiring, from the user, at least one forward mapping usable to map at least a source attribute of the source model to a conceptual attribute of the conceptual model, wherein the forward mapping includes a mapping formula. Further, the system includes means for loading a target schema and a target instance, means for converting the target schema and the target instance into a target model, and means for reverse mapping at least one of conceptual attributes of the conceptual model to a target attribute of the target model based on the forward mapping and the mapping formula.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIGS. 4A and 4B show graphical representations of exemplary source and target schemas, respectively;

FIGS. 5A and 5B show exemplary source and target schemas, respectively; and

FIG. 6 shows a block diagram of an exemplary system for schema mapping and data transformation of electronic documents.

DETAILED DESCRIPTION

Figure 1:
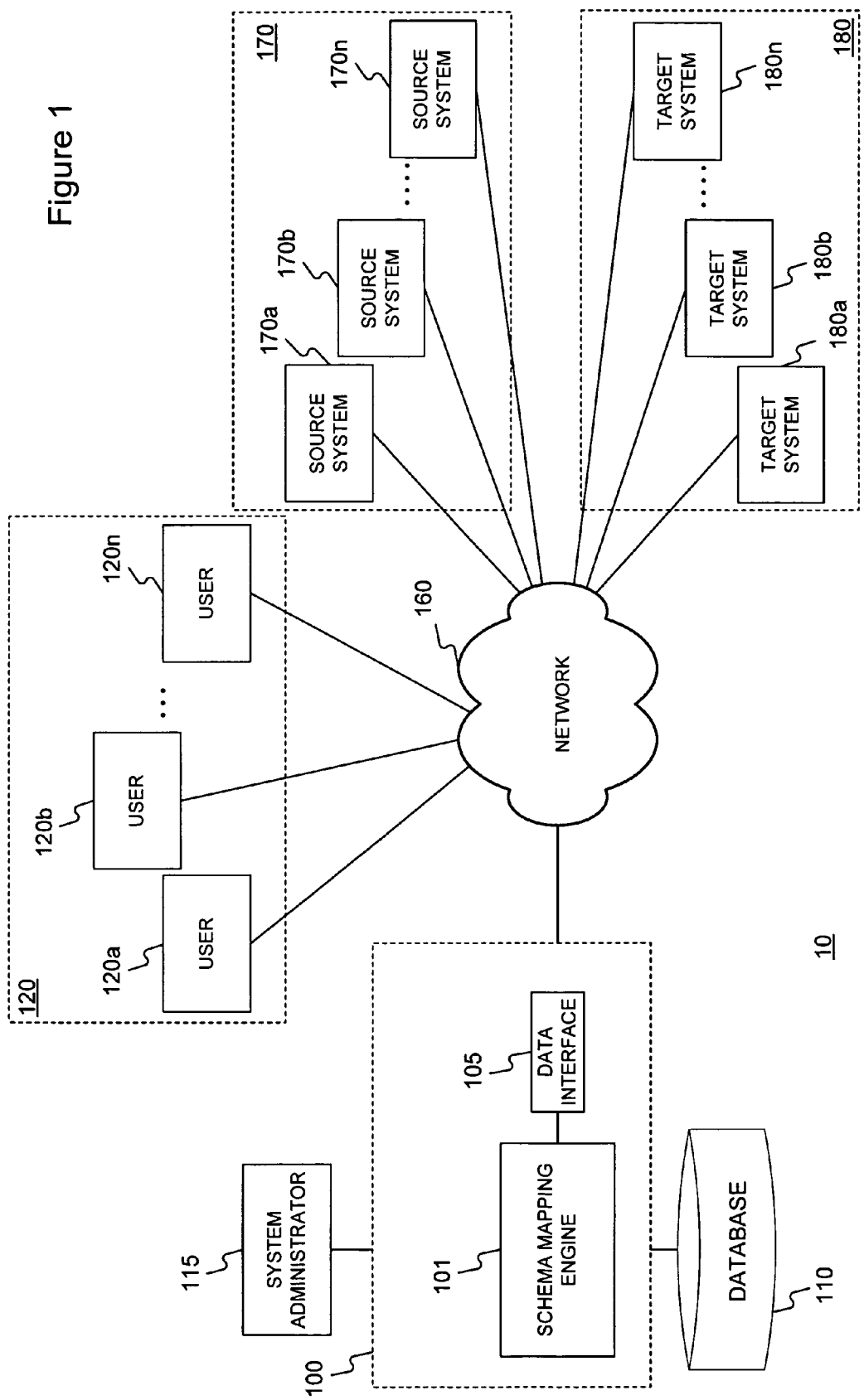
FIG. 1 illustrates a block diagram of an exemplary system configuration for implementing embodiments consistent with the principles of the present invention.

Reference will now be made in detail to embodiments of the invention, examples of which are illustrated in the accompanying drawings. Wherever possible, the same reference numbers will be used throughout the drawings to refer to the same or like parts.

Embodiments consistent with the present invention relate to systems and methods for schema mapping and transformation of data on the basis of layout and/or markup. Embodiments consistent with the invention further relate to systems and methods for schema mapping and data transformation of a source schema to a target schema.

The following definitions and explanations are intended to facilitate the understanding of the present invention without limiting its scope:

Extensible Markup Language (XML): XML is a standard format used to describe semi-structured documents and data. XML "tags" are embedded within the informational content of the document. When the XML document is subsequently transmitted between computer systems, the tags are used to parse and interpret the document by the receiving system. XML is an application of SGML.

Standard Generalized Markup Language (SGML): SGML is a generic language for writing markup languages. SGML makes possible different presentations of the same information by defining the general structure and elements of a document. XML and HTML (Hypertext Markup Language) are based on SGML.

XML Schema Definition (XSD): An XSD is an instance of an XML schema written in XML Schema language. An XSD defines a type of XML document in terms of constraints upon what elements and attributes may appear, their relationship to each other, what types of data may be in them, and other information. XSD may be used with validation software to ascertain whether a particular XML document is of that type, and to produce a post-schema validation information set.

Schema: Schema defines the structure, format, and type of contents of constituent structures of a document, e.g., a relational database, one or more XML files, one or more data files, and the like.

Document: a unit of information that contains plain, formatted, and/or structured text, schema and markup for structuring and formatting the text, graphics, sound, multimedia data, hyperlinks to other documents, and/or other contents. A document may be an instance of a schema. A document may also be referred to as a file. For example, a document may be a relational database, one or more XML files, one or more data files, a set of data, a data structure, and the like.

Content: Content is the values of elements or attributes of a document elements.

Markup: Structural information stored in the same document as the content of the document. Markup describes the structure and appearance of a document. In a document, if content is one level of information, markup is a second level, providing information about the content. Examples of markup include: element names, font attributes (e.g., type, size, color), placement on the page (e.g., left flush, right flush, centered), tables, images, hyperlinks, and formulas. Some markup languages (e.g., hypertext markup language, LaTeX, XML, and the like) may be directly edited in a text editor, while others are more easily edited in a program (such as Microsoft Word®). Different markup languages are designed for different purposes: Word for printable documents, papers, letters, and the like; HTML for web pages, links, images, and the like; LaTeX for formulas, research papers, data presentation, and the like.

Layout: The arrangement of text, graphics, sound, multimedia data, hyperlinks to other documents, and/or other contents within a document on a display (e.g., paper, electronic screen, and the like). A layout may arrange contents of the document on the display in accordance to the markup associated with the document.

Node: An element, or object that is part of a tree, and that is connected to other nodes by arcs.

Leaf: Refers to a terminal node of a tree or a node with no child/daughter.

Instance: In object-oriented technology, a member of a class. For example, "SAP" is an instance of the class "corporation." The term "instance" is used to refer to a document that is a member of the class of documents defined by a particular schema. Such a document is said to be an instance of the schema.

Path: The sequence of nodes encountered in the route between any two nodes (inclusive).

Resource Description Framework (RDF): RDF is a family of specifications for a metadata model that is often implemented as an application of XML. The RDF metadata model is based upon the idea of making statements about resources in the form of a subject-predicate-object expression, called a triple in RDF terminology. The subject is the resource, the "thing" being described. The predicate is a trait or aspect about that resource, and often expresses a relationship between the subject and the object. The object is the object of the relationship or value of that trait.

Knowledge Interchange Format (KIF): KIF is a computer-oriented language for the interchange of knowledge among disparate programs. KIF has declarative semantics and is logically comprehensive (i.e., KIF provides for the expression of arbitrary sentences in the first-order predicate calculus). KIF also provides for the representation of knowledge about the representation of knowledge. Moreover, KIF provides for the representation of non-monotonic reasoning rules and provides for the definition of objects, formulas, and relations.

XML Path Language (XPath): XPath is a language that describes a way to locate and process items in XML documents by using an addressing syntax based on a path through the document's logical structure or hierarchy. XPath uses a terse, non-XML, syntax for addressing portions of an XML document.

Web Ontology Language (OWL): OWL is a language for publishing and sharing ontologies on the Internet. OWL extends the vocabulary of RDF, and currently has three variations: OWL Lite, OWL DL, and OWL Full. These variations incorporate different features, for example, OWL Lite and OWL DL are constructed in such a way that every statement can be decided in finite time, while this might not be true of OWL Full.

Tree: A hierarchical structure made up of nodes. Nodes are connected by edges from one node (parent) to another (child). A single node at apex of the tree is known as the root node, while the terminus of a path in the opposite direction is a leaf.

Exemplary System Configuration

FIG. 1 is a block diagram of an exemplary system configuration 10 for implementing embodiments consistent with the principles of the present invention. System 10 may facilitate schema mapping and data transformation. For example, the components of system 10 may be adapted to allow a user to visually map schema and transform data on the basis of layout and/or markup. Further, one or more interfaces may be provided in system 10 to enable end users 120a-n to define or modify conceptual models, source schema, and/or target schema.

As shown in FIG. 1, system 10 includes a server 100 with a schema mapping engine 101 and, optionally, a data interface 105. Server 100 is connected to a database 110 for storing data, such as source schema received from a plurality of source systems 170a-170n, target schema received from a plurality of target systems 180a-180n, as well as conceptual models, data representing various schema mapping (e.g., forward mapping data and reverse mapping data), and/or other input provided from users 120a-120n. Data from source systems 170a-170n, target systems 180a-180n, and authorized users 120a-120n may be sent to server 100 via a network 160. Each of these components is described in greater detail below.

As will be appreciated by those skilled in the art, the number and orientation of the components illustrated in FIG. 1 are merely are examples and do not limit the scope of the invention. For example, source systems and target systems may be replaced by a database, a server or memory storage device (e.g., a disk, a memory stick or other types of RAM, and the like) for storing and loading one or more source schemas and target schemas, as well as source data and target data. The loading of schemas and/or data may be achieved via network 160 or directly via, for example, a disk drive or file transfer. In one embodiment, the database, server or memory storage device is implemented as a component or integral part of server 100. Therefore, as can be seen, other arrangements and sets of components are feasible, consistent with the principles of the invention. Further, it is noted that any combination of the components in system 10 may be owned and operated by an institution or entity. Moreover, several of the components (such as source systems 170a-170n, target systems 180a-180n, and server 100) may by owned and operated by a third party for the purposes of providing schemas, conceptual models, mapping data and/or otherwise facilitating a user to visually map two or more schemas and transform data.

Source systems 170a-170n may provide source schemas and/or source data. Examples of source schemas that may be provided by source systems 170a-170n include source schemas related to a purchase order, such as a source schema 590 (see FIG. 5A). Other examples of source schemas include source schemas related to a stock quote or other business objects. The source schema and/or source data from source systems 170a-170n may be sent to server 100 on a periodic basis (e.g., daily) or as requested by a user 120. All source schema and source data provided by source systems 170a-170n may be stored in database 110. Examples of source systems include commercially available sources of data, such as Bloomberg, Reuters, Associated Press, and the like. Examples of source systems further include other data sources, such as an equipment supplier, an equipment distributor, and the like.

Target systems 180a-180n may provide target schemas and/or target data. The target schema and/or target data from target systems 180a-180n may be sent to server 100 on a periodic basis (e.g., daily) or as requested by user 120. Examples of target schemas include target schemas related to a purchase order, such as target schema 595 (see FIG. 5B). Other examples of source schemas include target schemas related to a stock quote or other business objects. All target schema and target data provided by target systems 180a-180n may be stored in database 110.

Users 120a-120n represent authorized end users of system 10. As shown in FIG. 1, users 120a-n may be connected to server 100 via network 160, or may be directly connected to server 100 without utilizing network 160 (not shown). Access rights and privileges of each authorized user may be controlled by a system administrator 115. Conventional security models and techniques may be used for granting access rights and privileges to users 120a-120n. As further disclosed herein, the rights and privileges of each user may enable the user to retrieve, modify, and/or update source schemas, source instances, source models, conceptual models, target schemas, target instances, and target models stored in database 110, as well as generate, retrieve, update, and/or modify data mappings between source models, conceptual models, and/or target models using schema mapping engine 101 in server 100.

In operation, server 100 receives data from the various data sources in system 10 (i.e., users 120a-120n, source systems 170a-170n, and target systems 180a-180n). In one embodiment, the received data may be filtered, mapped and/or otherwise processed prior to analysis by schema mapping engine 101 or storage in database 110. For example, a data interface 105 may be provided to filter and map data from source systems 170a-170n and/or target systems 180a-180n. Such processing may normalize the data, catch exceptions or errors, or execute other relevant processing on the data.

The components shown in FIG. 1, including server 100, database 110, a system administrator 115, users 120a-120n, source systems 170a-170n, and target systems 180a-180n, may comprise a computing device or platform, such as a computer, laptop, server, mainframe and the like. By way of example, such a computing device may include a central processing unit (CPU), a disk drive, a memory, and/or a network access device. Further, server 100 may be embodied as a central server (as represented in FIG. 1) or any number of distributed servers (not shown), and may comprise software applications or modules for implementing schema mapping engine 101 and data interface 105.

The CPU of a computing device may be any appropriate processor or set of processors for executing program instructions. Memory may be RAM or any another permanent, semi-permanent, or temporary storage device, including ROM and flash memory. Disk drives may comprise a hard disk drive, an optical drive, or any other type of data storage device.

The network access device of a computing device may be a modem, a cable modem, an Ethernet card, a T1 line connector, or any other access device for connecting a respective system component (e.g., server 100, database 110, system administrator 115, users 120, source systems 170, target systems 180) to another system component or connecting a respective system component directly to network 160. Network 160 may be any combination of wired or wireless networks for facilitating the electronic communication of data. By way of example, network 160 may comprise a private network, such as a local area network (LAN), or a wide area network (WAN), and/or a public network, such as the Internet. Further, conventional protocols and encryption methods may be utilized for electronically transmitting data over network 160. For example, http or ftp protocols may be used for data transfers, and encryption may be achieved through secure ftp or secure copy.

Although not shown, each of the computing devices in FIG. 1 may be connected to one or more input devices, such as a keyboard, a mouse, or some other type of means for inputting data to computing device. Further, each of the computing devices may be connected to one or more display devices, such as a monitor or any other visual and/or audio-visual output device.

In the example of FIG. 1, server 100 receives data from source systems 170*a*-170*n* and target systems 180*a*-180*n*, and communicates with database 110 to retrieve and store data. For this purpose, database 110 may comprise any conventional database management system. Examples include, but are not limited to, an Oracle® relational database management system, a Microsoft® SQL Server, and Sybase®. In one embodiment, database 110 is configure to perform various formulas, such as data retrieval or calculations.

System administrator 115 may have various administrative responsibilities over system 10, such as maintaining the processing capabilities and/or other options in data interface 105, maintaining the data stored in database 110, and maintaining access rights and privileges of users. System administer 115 may also access system 10 as a user. System administrator 115 may also administer source and target data, including identifying data issues or errors and communicating with the source systems 170*a-n* and target systems 180*a*-180*n* to resolve data issues or errors.

Conceptual Model

Figure 2A:
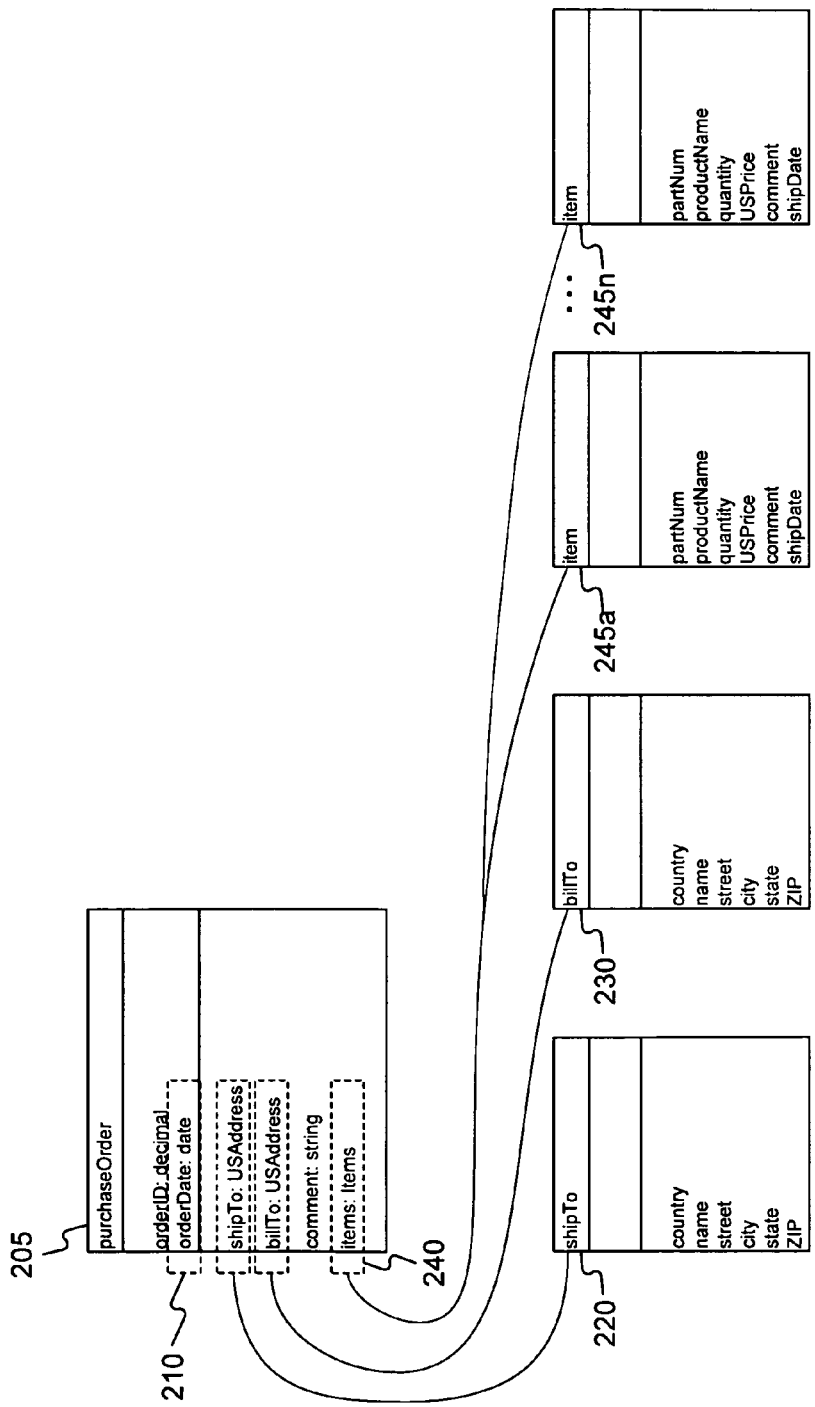
FIGS. 2A, 2B, and 2C show exemplary representations of a conceptual model for schema mapping and the transformation of data.
Figure 2B:
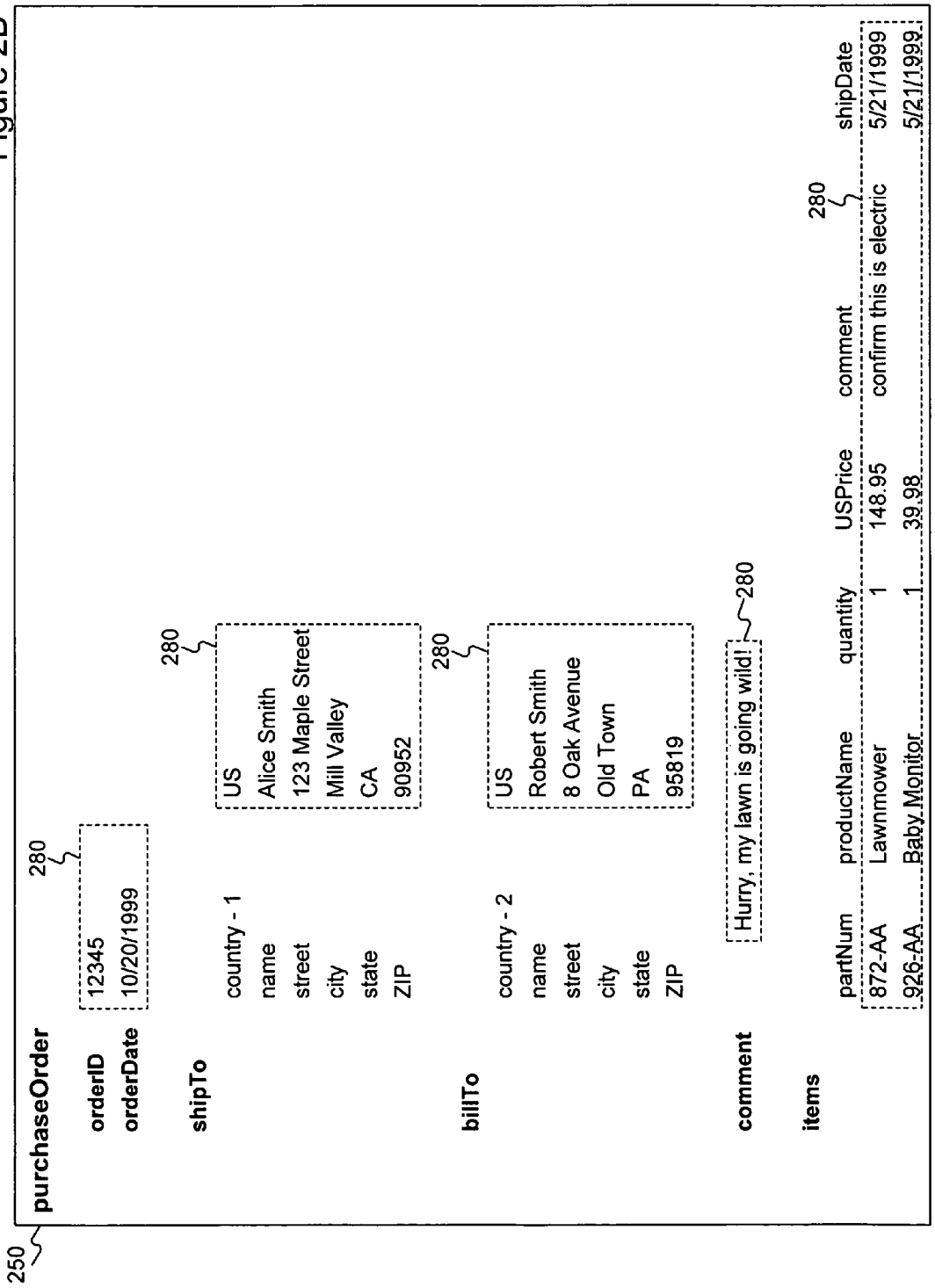
Figure 2C:
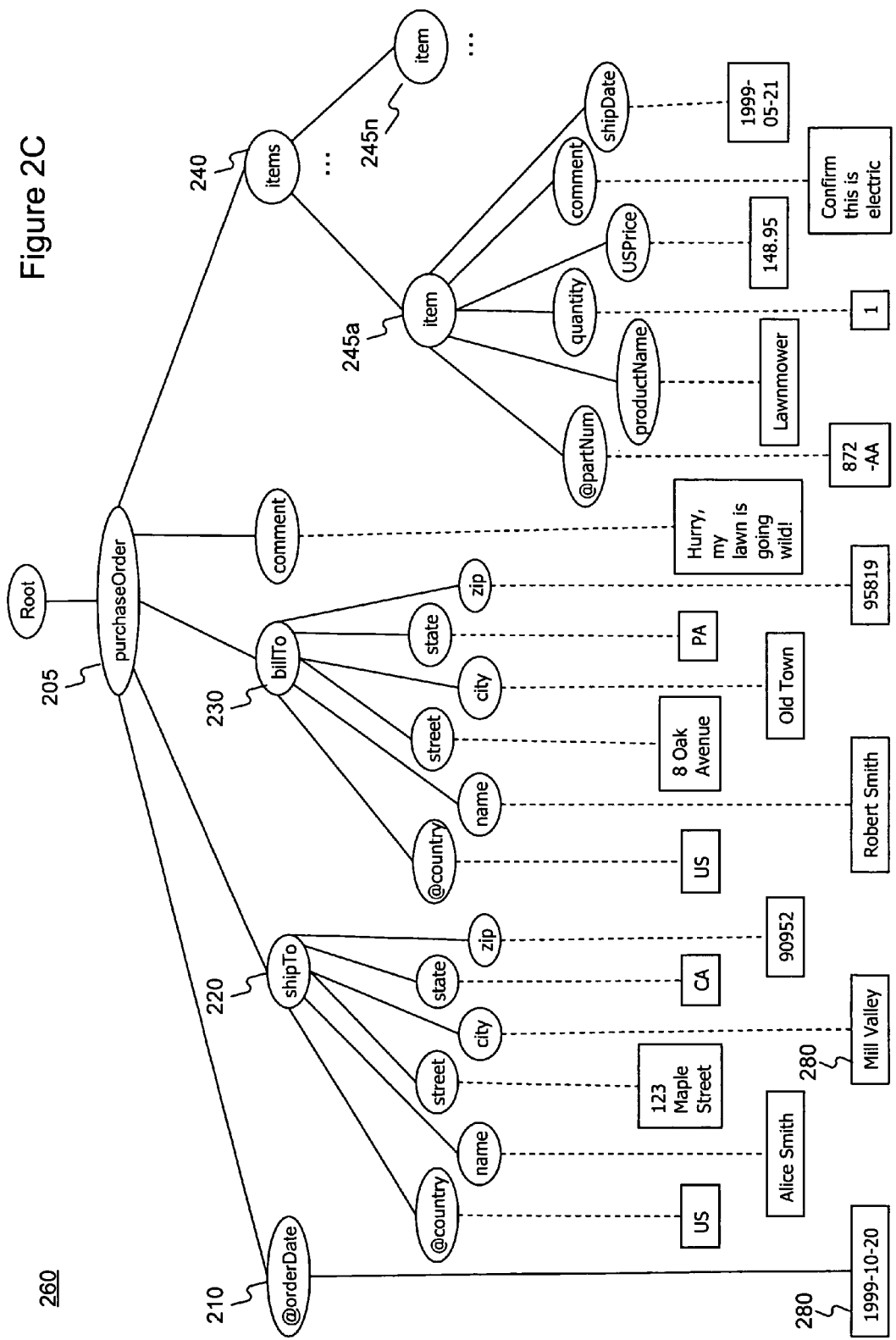

FIGS. 2A, 2B, and 2C show exemplary representations of a conceptual model for schema mapping and the transformation of data. In particular, FIG. 2A illustrates an exemplary conceptual model for representing a data model for mapping data schemas and transforming data, consistent with the principles of the present invention. The conceptual model may be implemented as a Resource Description Framework (RDF) schema or Web Ontology Language (OWL) ontology. The ontology may consist of classes, subclasses, properties and sub-properties.

Properties are global in scope and may be predicated of any class. However, there are common properties that are usually predicated of certain classes. In one embodiment, server 100 maintains a list of which properties to display as being associated with which class. This list may be shown when the class is first shown. The user may hide any of these properties as desired or add other existing properties to the display list. To find a property the user may either search for it, or browse the hierarchy of properties and sub-properties. The scope of a search may be controlled. In one embodiment, the narrowest scope is the current type of conceptual model. The broadest is the set of all conceptual models. In between are levels of the hierarchy of conceptual models.

Two types of properties may be provided. A first type of property has a literal as a value and a second type has an object as a value. The first type may be displayed as attributes of a class, while the second type may be displayed as relations to other classes. If no existing properties fit the user's needs, the user may create and add a new sub-property or property.

A conceptual model (e.g., conceptual model 200) may represent objects and relationships between the objects. As illustrated in FIG. 2A, the conceptual model may contain a root object (e.g., purchaseOrder 205) that is represented in three sections: the name (e.g., purchaseOrder), the attributes (e.g., orderID and orderDate 210), and a list of directly related objects or elements (e.g., shipTo 220, billTo 230, comment, and items 240). The user can add other objects to a conceptual model by clicking on these related objects. There may also be abstract objects that are not instantiated directly. Instead, the user must choose which of the possible instantiations to add to the representation.

Conceptual models may include labels for each component represented by the conceptual model. If labels are not sufficiently descriptive of the meaning of the values, the user can edit them to assign a display label. The original labels are maintained and may be restored or displayed if required. Re-labeling is useful when the labels are not very informative, e.g., have names like 'E241'. The user may also format labels and move both the labels and values around as desired. The user may also add labels and values. Moreover, in situations where two or more elements in an instance are labeled with the same name (e.g., shipTo country and billTo country in representation 250), server 100 may re-label the elements to differentiate the elements and to simplify mapping formula generation. For example, server 100 may add a number to the label to make it unique (e.g., "country—1," "country—2," etc.). All these changes may be saved with the mapping and may be used as layout for other instances of the same schema.

Labels may appear as pairs in the order they appear in the instance. Because attributes (e.g., @orderDate 210) are subordinate to an element, each of the attributes may appear as a label-value pair near the element qualified by the attribute. The label-value pair may be presented in a format that shows which element the attributes qualify. Labels may be also presented in a way that makes them easy to distinguish element values from attribute values.

FIG. 2B is an exemplary layout of an instance of a source schema 590 (represented in XSD as illustrated in FIG. 5A and as a tree 260 in FIG. 2C). The representation of the schema instance (e.g., representation 250, source representation 510) is created by laying out the content of the instance according to the tree structure of the instance, the tree structure including elements, attributes, and the values of elements and attributes. Values are the leaf elements of the tree. The representation shows the content and tree structure of the instance. Alternative forms of representation are possible. The user may display schema annotation (if provided) to help the user decipher the meaning of elements, attributes and their values.

A mapping formula for calculating a value for a target attribute or element may refer to one or more source attributes. Source attributes may be referred to using the names of the source attributes. In one embodiment, server 100 maintains the correspondence between the instance path (e.g., an XPath) and the elements and attributes for both the source and the target instances, because the instance path is needed to execute a transformation of an instance.

FIG. 2C is an exemplary tree 260 of the conceptual model 200 for representing a data model for mapping data schemas and transforming data, consistent with the principles of the present invention. The primary structure of the graph may be controlled so that an instance of the conceptual model is primarily represented as a tree. Therefore, each value of the conceptual model instance may be addressed using an instance path. Values of an element or attribute in the conceptual model are assigned to elements and attributes, and server 100 may maintain the association between the path to the value and the attribute.

Consistent with an aspect of the invention, if server 100 has no prior layout for a type of instance, server 100 assigns values and corresponding labels to elements (e.g., purchaseOrder 205, shipTo 220, billTo 230, items 240, item 245*a-n*, and the like) so that they appear as pairs in the order they appear in the instance. Because attributes (e.g., @orderDate 210) are subordinate to an element, attributes appear as a label-value pair near the element they qualify, and in such a way that it is clear which element they qualify. They can be represented in a way that makes it easy to distinguish element values from attribute values.

If there are repeating elements, server 100 may create only as many instances as necessary to create the represented mapping. For example, if there are no optional sub-element or optional attributes in the element, only one instance is represented. However, the representation may indicate to the user that the element does appear more times in the instance. If desired, server 100 may display more of the repetitions. Server 100 may record which elements are repeating. When server 100 transforms an instance of a source schema into an instance of the conceptual model, server 100 may generate a loop and create an object or set of objects in the conceptual for each repeated element in the source instance. As a mapping rule, this may be represented as follows:

Formula 1: Transforming repeating elements:

$$t_1[x]=f_1(s_i[x]\ldots,s_j[x],s_k)$$

For Formula 1: $t_1$ identifies the target value being calculated, $f_1$ identifies the name of the formula used to calculate the target value. The s subscripts are the input values to the formula. When followed by brackets, the input is an entire list of repeated values. Server 100 may input a list of all values for those source values (e.g., $s_i$, $s_j$, and the like) into Formula 1. During transformation, Formula 1 is interpreted to indicate that the number of target values (e.g., target values of an instance of the conceptual model) to create is the number of repetitions of source values in the source instance. One target value is calculated for each set of source values. Source values may be used in the order they appear in the instance to create each successive target value. All the source parameters with [x] must be from the same repetition. Other values from non-repeating elements may also be used to calculate the target value. In addition, a specific repeating element specified by explicit number is allowed. Server 100 may enforce such restrictions. Server 100 is capable of handling nested repetitions. For example, server 100 may calculate a target value like /Order/Item[1]/Delivery[1], /Order/Item[1]/Delivery[2], and the like. The source values for calculating these values may be obtained from same repetition sets of the repeating elements, or from explicitly named source values.

An additional mapping rule for transforming the source instance having repeating elements to the instance of the conceptual model may calculate one target value based on the set of repeated source values. This mapping rule may be represented as follows:

Formula 2: Transforming repeating elements:

$$t_2=f_2(s_i,\ldots,s_j,s_k)$$

Server 100 may input a list of all values for those source values (e.g., $s_i$, $s_j$, and the like) into formula 2. Server 100 may, for example, use a formula $t_2$=sum ($s_i$), where $s_i$ is the path /purchaseOrder/items/USPrice, to sum all U.S. prices listed in items of a purchaseOrder to create a total price. If necessary, server 100 may be extended to enable alternative methods for addressing collections of values that are used as the input to a formula to calculate a target value.

Attribute values (e.g., attribute values 280) may be represented as the leaf elements or leaf attributes of the instance tree. Server 100 may show the structure of the instance as a nested display, in which each element is enclosed in a box and the boxes are nested to show the structure. An alternative is to not show the structure except upon request by the user. Using a context-sensitive menu, the path associated with the element or attribute at the current position may be shown. The path can be displayed as a simple list of element or attribute names separated by a forward-slash sign. The user may modify the representation created by the layout process. The user may add or modify text and may use text formatting formulas, e.g., font size, font color, font style, and the like. Any modifications made may be saved in the repository (e.g., database 110) and used the next time an instance of the document type is loaded into server 100.

Data Mapping Process Using a Conceptual Model

Figures 4A, 4B:
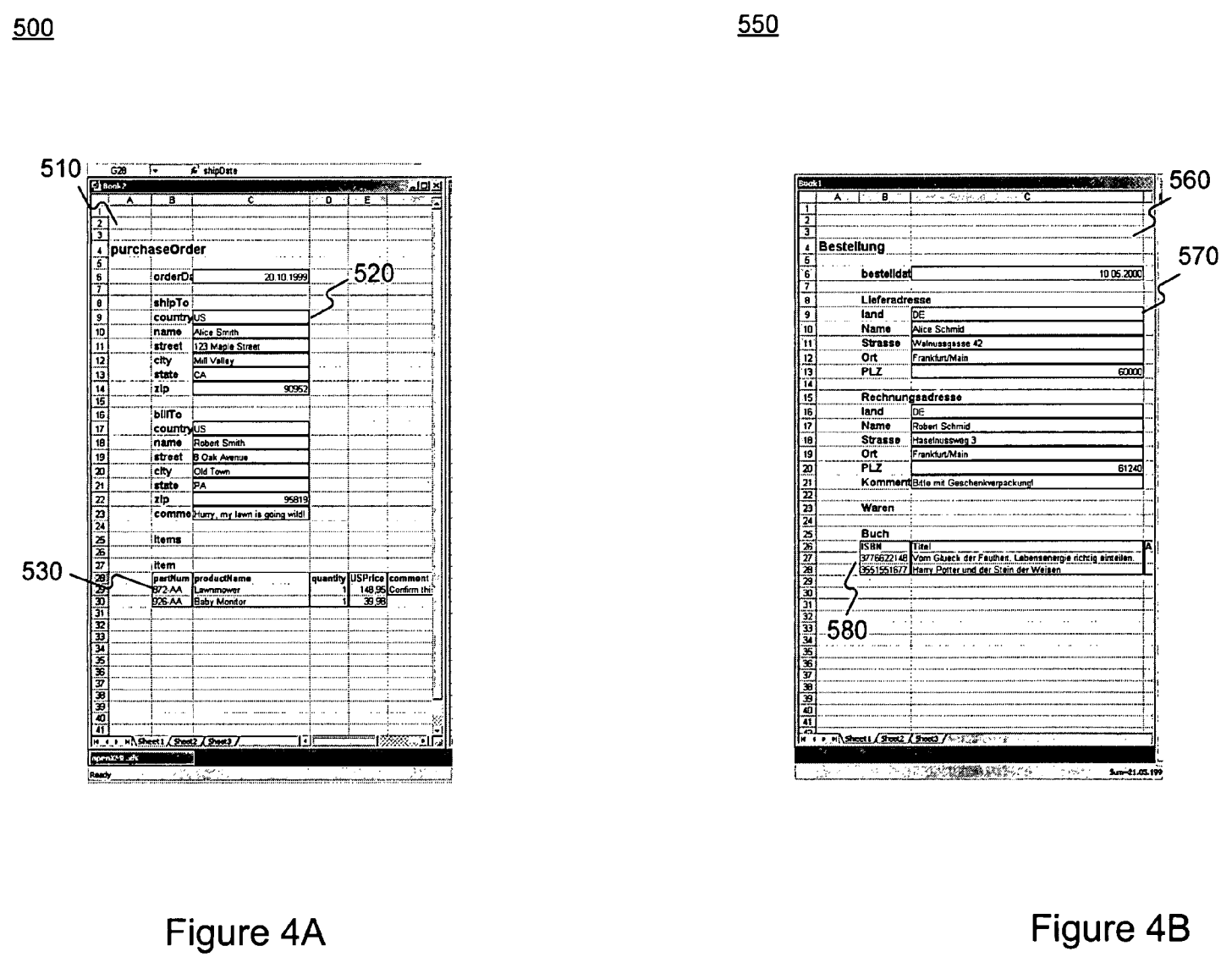

FIGS. 4A and 4B show graphical representations of exemplary source and target schemas, respectively. A source representation 510 (as shown in FIG. 4A) is based on an instance of the source schema (e.g., source schema 590). A target representation 560 (as shown in FIG. 4B) is based on an instance of the target schema (e.g., target schema 595). Source representation 510 may be created by laying out the content of the source instance according to the source schema, including labels (e.g., "orderDate," "shipTo," "country," etc., as illustrated in source representation 510), elements, attributes, and the values of elements and attributes (e.g., values in source slots 520 and 530, etc.). Target representation 560 may be created by laying out the content of the target instance according to the target schema, including labels (e.g., "bestelldat," "Lieferaddress," "land," etc., as illustrated in target representation 560), elements, attributes, and the values of elements and attributes (e.g., values in target slots 570 and 580, etc.).

FIGS. 5A and 5B illustrate exemplary schemas written in XML Schema language. Source schema 590 is an instance of an XML schema written in XML Schema language. Likewise, target schema 595 is an instance of an XML schema written in XML Schema language. Source schema 590 and target schema 595 each define a type of XML document (e.g., purchaseOrder 250) in terms of constraints upon what elements and attributes may appear, their relationship to each other, what types of data may be in them, and other information. Source schema 590 and target schema 595 may each be used with validation software to ascertain whether a particular XML document (e.g., purchaseOrder 250) is of that type, and to produce a post-schema validation information set.

Figure 3A:
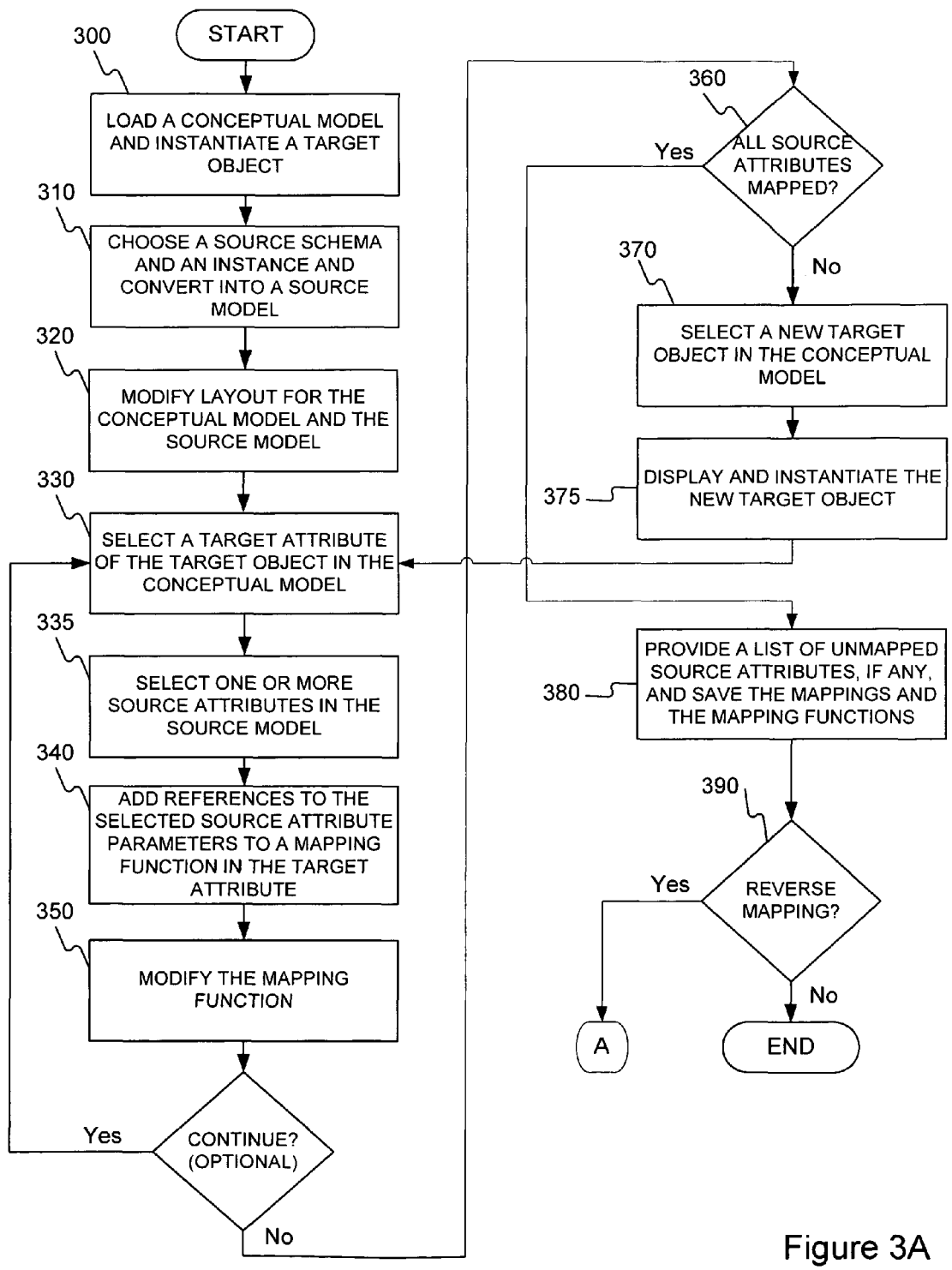
FIGS. 3A and 3B show flow diagrams of an exemplary process for schema mapping and the transformation of data.
Figure 3B:
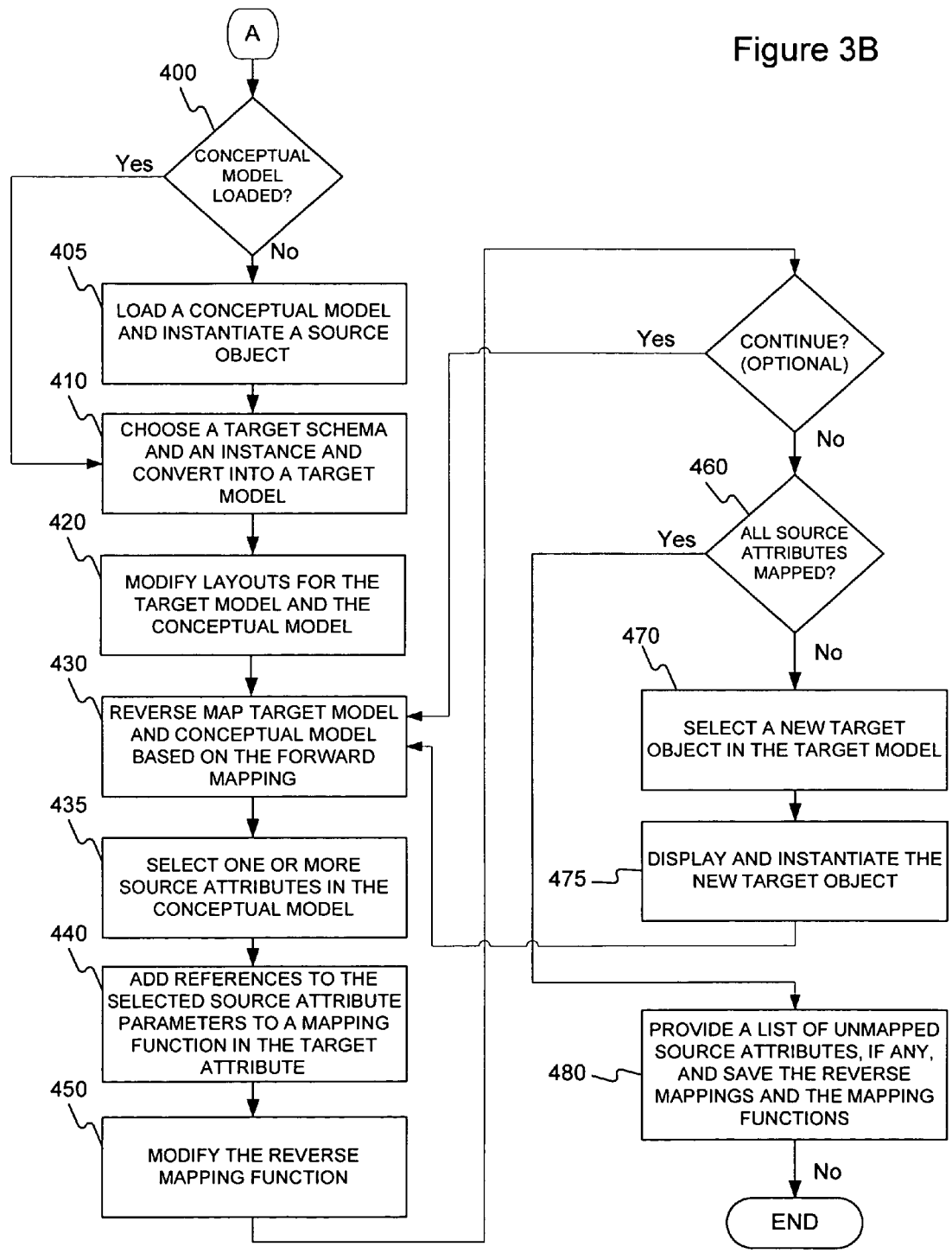

FIGS. 3A and 3B show flow diagrams of an exemplary process for schema mapping and the transformation of data, consistent with an embodiment of the invention. For purposes of illustration, FIGS. 3A and 3B will be described with reference to the exemplary system of FIG. 1. It will be appreciated, however, that the exemplary method may be implemented with other systems, consistent with the principles of the invention. Further, it will be appreciated that the various displays of data and collection of data described below may be supported by a graphical user interface (GUI) and/or other suitable user interfaces.

Consistent with an embodiment of the invention, schema mapping engine 101 in server 100 uses a conceptual model of a business object, e.g., a Purchase Order (PO 200), as the conceptual model. A source model is generated based on a data schema that represents the same type of business object represented by the conceptual model, e.g., PO 200.

It is assumed that the conceptual model has been created and exists, e.g., as an RDF model. An overview of the steps for mapping from a source schema to a target schema using a conceptual model as an intermediary is provided below. At any point during the mapping process, if a user (e.g., one of the users 120) elects to save his or her mapping and/or exit from the mapping process, the mapping process may jump to step 380.

In step 300, the user selects a conceptual model (e.g., PO model 200). Server 100 loads the selected conceptual model for the business object and its layout, and displays in a target window a representation of the conceptual model (e.g., PO model 200) to the user. Server 100 may also display example values for some or all attributes of the conceptual model. As will be appreciated by those skilled in the art, such displays and windows may be implemented using a graphical user interface (GUI) or similar technology at a user station or device.

Next, in step 310, the user selects a source schema and an instance of the source schema (e.g., an XML schema file, a relational database schema, or the like). Server 100 converts the source schema and the instance into a source model (e.g., an RDF model, a KIF model, or the like). Server 100 may also create a layout for the source model based on the source schema and/or user-defined parameters, and display to the user the source model according to the layout in a source window. The source model and the conceptual model may be displayed in, respectively, source window (e.g., source representation 510) and target windows.

If a source instance does not exist, server 100 allows the user to create new instances based on the source schema, if needed, or to extend existing instances of the source schema. Server 100 may create a form in which the user can enter values for leaf elements. This form may appear similar to the user interface (e.g., user interfaces 500 and 550), except that some slots for source values (e.g., source slots 520 and 530) are blank, because there are no values for them in the instance, either because there is no instance, or the current instance has no values for those elements or attributes.

To extend the instance or create a new instance, the user may enter values in the blank slots. These values may be checked for consistency with the constraints expressed by the schema (e.g., source schema 590). This procedure can be performed on the source instances, and the entered information may be saved in a repository (e.g., database 110).

In one embodiment, the source and target windows may be displayed simultaneously in, for example, a side-by-side fashion using a GUI or display screen. In step 320, the user may modify the layout for either the conceptual model or the source model. This enables the user to modify labels or layout to make the layout easier to comprehend.

Next, the user maps the source model to the conceptual model, a first mapping process referred to herein as "forward mapping." In one embodiment consistent with the invention, the user may map the source model to the conceptual model in a top-down manner, i.e., starting with the top-level object in the conceptual model. Server 100 may provide automated mapping suggestion(s) to the user. These can be either generic mapping formulas with source values as parameters or, in some cases, specific mapping formulas. The automated suggestions may be based on the conceptual model, the source model, and/or previous mappings, either from a repository (e.g., database 110) or current work of the user. For example, if the source schema has a complex type called Address, and the user maps its sub-elements to the sub-elements of the target object PostalAddress, then server 100 searches for other elements of type Address and creates suggestions to map them to other unmapped PostalAddress target objects.

Automated suggestions may be prioritized by applying matching algorithms to compute the degree of match between each (element, object) pair. Matching may be based on such features as similarity of names, annotation, attributes and relations. The automated suggestions may be included in the target attribute as a drop-down list, ordered from most likely to least likely. For example, if there are two Address elements and three PostalAddress objects, each of the unmapped PostalAddress objects will have a drop-down list with two entries.

Standard existing matching algorithms may be used to provide automated suggestions. By way of example, a matching algorithm is described in H. Do and E. Rahm, "COMA—A System for Flexible Combination of Schema Matching Approaches," published 2002 by VLDB, the entire contents of which are expressly incorporated herein by reference.

Server 100 may use the matching algorithm(s) to create an initial list of prioritized mapping suggestions for the target attributes of top level elements, e.g., the direct leaves of PO object 205. As the user continues to map the target attributes to the source attributes, server 100 updates the suggestions as objects that are added to the conceptual model. For example, after the user maps a sub-element or attribute of the source model to an attribute of an object in the conceptual, server 100 applies the matching algorithm(s) to the object in the conceptual model to try to match the object's attributes against those of the source. Matches above a user-specified level of probability of being correct are gathered together and made into the parameters of an abstract formula that is placed in the list of suggestions to be displayed in the target attribute. After that object has been mapped, server 100 may attempt to match conceptual model objects of the same type with elements of the source model that have the same type as the source element that matched the conceptual object.

In step 330, the user may select an attribute value of a target object in the conceptual model (e.g., attribute value 280 of purchaseOrder 205 in PO 200) in the target window. Then, in step 335, the user may select one or more source attributes of the source model in the source window that match the selected target attribute in the target window. For example, the selected target attribute may be mapped from one source attribute or multiple source attributes. Alternatively, if server 100 has provided automated suggestions, the user may choose or reject the automated mapping suggestions for the selected target attribute. Next, in step 340, server 100 adds the references to the selected source attribute parameters to a mapping formula in the target attribute. Depending on configuration options, the original example value of the target attribute may be made invisible or displayed above the target attribute when performing, for example, a mouse-over.

In step 350, the user may modify the mapping formula in the target attribute to calculate the value of the target attribute as a formula of the source attribute(s). The mapping formula may also use any constants stored in the conceptual model. Server 100 displays the result of the mapping formula in the target attribute, thus allowing the user to verify that the forward mapping has been correctly performed. The user may repeat steps 330-350 to map other source attributes in the source model to applicable target attributes in the conceptual model until every applicable target attribute has a value calculated from the corresponding source attributes. This enables the user to see the results of the mapping in real-time as the user maps source attributes to applicable target attributes. Any target attributes in the conceptual model that are not applicable may be hidden from view to keep the representation simpler and less cluttered.

Next, in step 360, server 100 may determine which source attributes in the source model have not been mapped to target attributes, and may display that determination to the user. If server 100 determines in step 360 that all source attributes in the source model have been mapped to target attributes, the mapping process may proceed to step 380. Alternatively, the mapping process may proceed to step 370, allowing the user to select another target object in the conceptual model. In step 375, server 100 displays the selected object to the target window and instantiates the selected object. If the selected object cannot be directly instantiated (e.g., an abstract class, such as LegalEntity class), server 100 prompts the user to choose one or more of the selected object's instantiable subclasses (e.g., Person and Corporation subclasses) to represent, for example, the legal entities participating in the purchasing process. After step 375, the mapping process returns to step 330.

In step 380, if server 100 determines that not all source attributes in the source model have been mapped, server 100 may provide a list of unmapped source attributes and alert the user. The user may cycle through the unmapped source attributes to determine if they need to be mapped. If so, the user selects a target attribute and the mapping process returns to step 330. If the user determines that any of the unmapped source attributes do not need to be mapped, the user may mark them as "do not need to map."

Alternatively, in step 380, if server 100 determines that all source attributes in the source model have been mapped to one or more target attributes in the conceptual model, server 100 may save the mappings between the source model and source instance to the conceptual model and the layout. This mapping information may be recorded in a repository (e.g., database 110), and may be used for generating automated suggestions. Furthermore, server 100 may forward transform, either automatically (via, for example, a trigger or a batch job) or in response to a request by the user, the source instance into an instance of the conceptual model based on the forward mapping.

Server 100 may execute the forward transformation by using the forward mapping information, which may contain a list of target attributes (which may be in the form of target paths) associated with the transformation formula and its inputs, and the source attributes (which may be in the form of source paths). An exemplary forward mapping information $t_n$ may be represented as $t_1=f_a(s_i, s_k \ldots), t_2=f_d(s_m, s_j \ldots), \ldots, t_n=f_n(s_x, s_y \ldots)$, wherein 't' and 's' are paths, e.g., $s_i$ may be '/Order/BuyerParty/Party/PartyName/Name'. There may be one entry in the list for each target path on the left side of the equal sign. Each entry corresponds to one of the target attributes created during the forward mapping process. The entry is interpreted as an instruction to retrieve the value at the end of each source path, use these values as inputs to the formula, calculate the output value, create the target path if it does not already exist, and add the value to the end of the target path. In this way the instance of the conceptual model is constructed from the source instance. If, however, a source value in the source path is missing because it is optional or because it is part of a choice and was not chosen. In these cases, all target values that depend on the missing source value may not be included or calculated unless server 100 can determine a default value for those target values.

Next, in step 390, if a data transformation from the conceptual model to a target model (e.g., a second mapping process referred to as a "reverse mapping") is needed or requested then the mapping process proceeds to step 400. Consistent with an embodiment of the invention, a target model is generated based on a data schema that represents the same type of business object represented by the conceptual model, e.g., PO 200.

In step 400, server 100 determines whether the conceptual model is loaded in a memory. If the conceptual model is loaded in the memory, the mapping process proceeds to step 410. If the conceptual model is not loaded in the memory, server 100 may prompt the user (e.g., one of the users 120) to select a conceptual model (e.g., PO model 200). To limit the mapping task to the concepts covered by the source model, the user may load the conceptual model as adapted for the source model and map from the conceptual model to the target model. At any point during the reverse mapping process, if the user elects to save his or her reverse mapping and/or exit from the mapping process, the mapping process may jump to step 480. Server 100 loads the selected conceptual model for the business object, its layout and an instance of the conceptual model, and displays in a source window a representation of the conceptual model to the user (step 405). Server 100 may also display example values for some or all attributes of the business object model.

Next, in step 410, the user chooses a target schema (e.g., an XML schema file, a relational database schema, or the like) and an instance of the target schema. Server 100 creates a target model based on the target schema and the target instance and creates a layout for the target model based on the target schema and/or user-defined parameters, and display to the user the target model according to the layout in a target window. If a target instance does not exist, server 100 allows the user to create new instances based on the target schema, if needed, or to extend existing instances of the target schema. Server 100 may create a form in which the user can enter values for leaf elements. This form may appear similar to the user interface (e.g., user interface 550), except that some slots for target values (e.g., target slots 570 and 580) are blank, because there are no values for them in the instance, either because there is no instance, or the current instance has no values for those elements or attributes.

To extend the instance or create a new instance, the user may enter values in the blank slots. These values may be checked for consistency with the constraints expressed by the schema (e.g., target schema 595). This procedure can be performed on the target instances, and the entered information may be saved in a repository (e.g., database 110). The conceptual model and the target model may be displayed in the source and target windows side-by-side. In step 420, the user may modify the layout for either the conceptual model or the target model. This enables the user to modify labels or layout to make the layout easier to comprehend.

In step 430, the user may instruct server 100 to reverse the mappings between the source model and the conceptual model to the target model. Server 100 may use the forward mapping rules to compute some or all of reverse mappings (e.g., the conceptual model to the target model) from the forward mappings (e.g., the source model to the conceptual model). For example, if a target attribute is a direct copy of a source attribute, then the reverse formula is also a copy. As another example, if a target attribute is a combination (e.g., a complete shipping address) of source attributes, then the reverse formula may divide the target attribute into address components (e.g., street address, city, state, ZIP Code, and the like).

In step 435, the user may select one or more source attributes of the conceptual model in the source window that match the selected target attribute in the target window. For example, the selected target attribute may be mapped from one source attribute or multiple source attributes. Next, in step 440, server 100 adds the references to the selected source attribute parameters to a mapping formula in the target attribute. Depending on configuration options, the original example value of the target attribute may be made invisible or displayed above the target attribute on mouse-over.

In step 450, the user may modify the reverse mappings and the corresponding reverse mapping formula in the target attributes to calculate the value of the target attribute as a formula of the source attribute(s). The user may also add new reverse mappings and reverse mapping formulas that server 100 could not determine from the forward mapping. Server 100 displays the result of the reverse mapping formula in the target attribute, thus allowing the user to verify that the reverse mapping has been correctly performed. The user may repeat steps 430-450 to map other source attributes in the conceptual model to applicable target attributes in the target model until every applicable target attribute has a value calculated from the corresponding source attributes. This enables the user to see the results of the mapping in real-time as the user maps source attributes to applicable target attributes. Any target attributes in the target model that are not applicable may be hidden from view to keep the representation simpler and less cluttered.

Next, in step 460, server 100 may determine which source attributes in the conceptual model have not been mapped to target attributes. A list of any unmapped source attributes may be displayed to the user. If server 100 determines in step 460 that all source attributes in the source model have been mapped to target attributes, the reverse mapping process may proceed to step 480. Alternatively, the reverse mapping process may proceed to step 470, to allow the user to select another target object in the target model. In step 475, server 100 displays the selected object to the target window and instantiates the selected object. If the selected object cannot be directly instantiated, server 100 prompts the user to choose one or more of the selected object's instantiable subclasses to represent the legal entities participating in the purchasing. After step 475, the reverse mapping process returns to step 430.

In step 480, server 100 may confirm that all source attributes in the conceptual model have been mapped to one or more target attributes in the target model. If so, server 100 saves the reverse mappings between the conceptual model and the instance of the conceptual model to the target model and the target layout. This mapping information may be recorded in a repository (e.g., database 110). Moreover, server 100 may reverse transform, either automatically (via, for example, a trigger or a batch job) or in response to a request by the user, an instance of the conceptual model into an instance of the target model based on the reverse mapping, using a reverse transformation similar to the forward transformation described above.

Alternatively, in step 480, if server 100 determines that not all source attributes in the conceptual model have been mapped, server 100 may provide a list of any unmapped source attributes and alert the user. The user may cycle through the unmapped source attributes to determine if they need to be mapped. If so, the user selects a target attribute and the reverse mapping process returns to step 430. If the user determines that any of the unmapped source attributes do not need to be mapped, the user may mark them as "do not need to map." Thereafter, the reverse mappings between the conceptual model and the instance of the conceptual model to the target model and the target layout may be saved.

Systems and methods consistent with embodiments of the present invention may be implemented by any suitable combination of hardware, software and/or firmware, such as computers organized in a conventional distributed processing system architecture. FIG. 6 is a block diagram illustrating an exemplary computer system 600 in which embodiments consistent with the invention may be implemented. Computer system 600 includes a computer 601 having a bus 602 or other communication mechanism for communicating information, and a processor 604 coupled with bus 602 for processing information. Computer 601 also includes a main memory, such as random access memory (RAM) 606 or other dynamic storage device, coupled to bus 602 for storing information and instructions to be executed by processor 604. RAM 606 also may be used for storing temporary variables or other intermediate information during execution of instructions to be executed by processor 604. Computer 601 may further include a read only memory (ROM) 608 or other static storage device coupled to bus 602 for storing static information and instructions for processor 604. A storage device 610, such as a magnetic disk or optical disk, may be provided and coupled to bus 602 for storing information and instructions.

Computer 601 may be coupled via bus 602 to a display 612, such as a cathode ray tube (CRT), for displaying information to a computer user. An input device 614, such as a keyboard including alphanumeric and other keys, is coupled to bus 602 for communicating information and command selections to processor 604. Another type of user input device is cursor control 616, such as a mouse, a trackball or cursor direction keys for communicating direction information and command selections to processor 604 and for controlling cursor movement on display 612. This input device typically has two degrees of freedom in two axes, a first axis (e.g., x) and a second axis (e.g., y), which allow the device to specify positions in a plane. System 600 may further include an input drive device 617, such as a CD reader, for reading high-capacity computer-readable media, such as CD-ROMs and CDRs.

According to one implementation, systems and methods consistent with the present invention provide for the mapping of schema and transformation of data on the basis of layout and/or markup when processor 604 executes one or more sequences of instructions, such as schema mapping tool 607, contained in RAM 606. Such instructions may be read into RAM 606 from a computer-readable medium via an input device such as storage device 610. Execution of the sequences of instructions contained in main memory 606 causes processor 604 to perform the process steps described herein. In an alternative implementation, hard-wired circuitry may be used in place of or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other medium from which a computer can read.

Various forms of computer-readable media may be involved in carrying one or more sequences of instructions to processor 604 for execution. For example, the instructions may initially be carried on the magnetic disk of a remote computer. The remote computer can load the instructions into its dynamic memory and send the instructions over a telephone line using a modem. A modem (not shown) local to computer system 600 can receive the data on the telephone line and supply the data to computer 601 via a communications interface 618, which places the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 may also provide a two-way data communication coupling to a network link 620 that may be connected to a local network 622. For example, communication interface 618 may support an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 and/or to data equipment operated by an Internet Service Provider (ISP) 626. ISP 626, in turn, provides data communication services through the Internet 628. Local network 622 and Internet 628 both use electric, electromagnetic, or optical signals to carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620, and communication interface 618. In the Internet example, a server 630 might transmit requested program instructions for an application program through Internet 628, ISP 626, local network 622, and communication interface 618. Consistent with the present invention, one such downloaded application in the form of schema mapping tool 607 comprising a module for mapping data schemas and transforming data on the basis of data mappings, data layout, and data markup. The received application code may be loaded in RAM 606 and executed by processor 604 as it is received. Alternatively, or in addition, it may be stored in storage device 610, or other non-volatile storage for later execution. In this manner, computer system 600 may obtain application code in the form of a carrier wave.

Although computer system 600 is shown in FIG. 6 as being connectable to one server 630, those skilled in the art will recognize that computer system 600 may establish connections to multiple servers on Internet 628. Such servers may include a client-server or an HTML-based Internet application, which may provide information to computer system 600 upon request in a manner consistent with the present invention.

While the present invention has been described in connection with various embodiments, modifications will be readily apparent to those skilled in the art based on the teachings of this disclosure. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

The foregoing description has been presented for purposes of illustration and description. It is not exhaustive and does not limit the invention to the precise forms, features or embodiments disclosed. Modifications and variations are possible in light of the above teachings and/or may be acquired from practicing embodiments of the invention. Other embodiments of the invention will be apparent to those skilled in the art from consideration of the specification and practice of the embodiments of the invention disclosed herein. Therefore, the specification and examples should be considered as exemplary only, with a true scope and spirit of the invention being indicated by the following claims.

What is claimed is:

1. A computer-implemented method for schema mapping and data transformation, the method comprising the following steps performed by a processor:

obtaining information associated with a conceptual model, wherein the conceptual model comprises at least one conceptual object;

identifying a source model corresponding to a source schema and at least one source instance;

receiving first mapping data for mapping a source attribute of the source model to a conceptual attribute of the conceptual model;

generating, based on the first mapping data, a first mapping formula for transforming values associated with the source attribute into at least one value associated with the conceptual attribute;

identifying a target model corresponding to a target schema and at least one target instance; and generating second mapping data for mapping the conceptual attribute of the conceptual model to a target attribute of the target model, based on the first mapping data and the first mapping formula, wherein:

the source attribute values comprise a plurality of duplicate values;

generating the first mapping formula comprises generating a formula to perform a common operation on the duplicate values; and the method further comprises generating, based on the second mapping data and the first mapping formula, a second mapping formula for transforming the conceptual attribute value into at least one value associated with the target attribute, the second mapping formula comprising an inverse of the transformation of the first mapping formula.

2. The method of claim 1, further comprising:
providing, to a user, an indication of a suggested mapping between a first attribute of the source model and a second attribute of the conceptual model, based on at least the first mapping data.

3. The method of claim 2, wherein the providing comprises:
providing the indication of suggested mapping based on a user-specified level of probability.

4. The method of claim 1, further comprising:
creating a conceptual layout for the conceptual model;
creating a source layout for the source model;
displaying the source model to a user in accordance to the conceptual layout; and
displaying the conceptual model to the user in accordance to the conceptual layout, wherein the source model and the conceptual model are juxtaposed.

5. The method of claim 4, further comprising:
modifying at least one of the conceptual layout and the source layout; and
storing the modified layout.

6. The method of claim 4, further comprising:
creating a target layout for the target model;
displaying the conceptual model to the user in accordance to the conceptual layout; and
displaying the target model to the user in accordance to the target layout, wherein the conceptual model and the target model are juxtaposed.

7. The method of claim 1, further comprising:
providing a list of unmapped attributes in the conceptual model to a user; and
providing an indication to the user that an attribute in the list of unmapped attributes does not need to be mapped.

8. The method of claim 7, further comprising:
providing a list of unmapped target attributes in the target model to the user; and
providing an indication to the user that a target attribute in the list of unmapped target attributes does not need to be mapped.

9. The method of claim 1, wherein identifying the source model comprises:
obtaining the source schema and the source instance; and
converting the source schema and the source instance into the source model.

10. The method of claim 1, wherein identifying the target model comprises:
obtaining the target schema and the target instance; and
converting the target schema and the target instance into the target model.

11. The method of claim 1, wherein generating the first mapping formula comprises generating a formula to convert the source attribute values into corresponding values of the conceptual attribute.

12. The method of claim 1, wherein generating the first mapping formula comprises generating a formula to merge the source attribute values to generate the conceptual attribute values.

13. The method of claim 1, wherein at least one of the source model, the target model, or the conceptual model are associated with a business object.

14. The method of claim 13, further comprising:
receiving information indicative of a triggering incident associated with the business object; and
in response to the triggering incident, at least one of (i) mapping the source attribute to the conceptual attribute using the first mapping data, or (ii) mapping the conceptual attribute to the target attribute using the second mapping data.

15. The method of claim 14, wherein the triggering incident comprises an initiation of a batch job.

16. The method of claim 14, wherein the triggering incident comprises a request from a user.

17. A computer-readable medium containing instructions for performing, when executed by a processor, a method for schema mapping and data transformation, the method comprising:
obtaining information associated with a conceptual model, wherein the conceptual model comprises at least one conceptual object;
identifying a source model corresponding to a source schema and at least one source instance;
receiving first mapping data for mapping a source attribute of the source model to a conceptual attribute of the conceptual model;
generating, based on the first mapping data, a first mapping formula for transforming values associated with the source attribute into at least one value associated with the conceptual attribute;
identifying a target model corresponding to a target schema and at least one target instance; and
generating second mapping data for mapping the conceptual attribute of the conceptual model to a target attribute of the target model, based on the first mapping data and the first mapping formula, wherein:
the source attribute values comprise a plurality of duplicate values;
generating the first mapping formula comprises generating a formula to perform a common operation on the duplicate values; and
the method further comprises generating, based on the second mapping data and the first mapping formula, a second mapping formula for transforming the conceptual attribute value into at least one value associated with the target attribute, the second mapping formula comprising an inverse of the transformation of the first mapping formula.

18. The computer-readable medium of claim 17, wherein the method further comprises:
providing, to a user, an indication of a suggested mapping between a first attribute of the source model and a second attribute of the conceptual model based on the at least one forward mapping.

19. The computer-readable medium of claim 17, wherein the method further comprises:
providing a list of unmapped attributes in the conceptual model to a user; and
providing an indication to the user that an attribute in the list of unmapped attributes does not need to be mapped.

20. A system for schema mapping and data transformation, the system comprising:
a memory having program instructions; and
a processor executing the program instructions to perform the steps of:
obtaining information associated with a conceptual model, wherein the conceptual model comprises at least one conceptual object;

identifying a source model corresponding to a source schema and at least one source instance;

receiving first mapping data for mapping a source attribute of the source model to a conceptual attribute of the conceptual model;

generating, based on the first mapping data, a first mapping formula for transforming values associated with the source attribute into at least one value associated with the conceptual attribute;

identifying a target model corresponding to a target schema and at least one target instance; and generating second mapping data for mapping the conceptual attribute of the conceptual model to a target attribute of the target model, based on the first mapping data and the first mapping formula, wherein:

the source attribute values comprise a plurality of duplicate values;

generating the first mapping formula comprises generating a formula to perform a common operation on the duplicate values; and the a processor further executes the program instructions to generate, based on the second mapping data and the first mapping formula, a second mapping formula for transforming the conceptual attribute value into at least one value associated with the target attribute, the second mapping formula comprising an inverse of the transformation of the first mapping formula.

21. The system of claim 20, wherein the steps further comprise:

providing an indication, to a user, of a suggested mapping between a first attribute of the source model and a second attribute of the conceptual model based on the at least one forward mapping.

22. The system of claim 21, wherein the steps further comprise:

providing the indication of the suggested mapping based on a user-specified level of probability.

23. The system of claim 20, wherein the steps further comprise:

creating a conceptual layout for the conceptual model;

creating a source layout for the source model;

displaying the source model in accordance to the conceptual layout to a user; and displaying the conceptual model in accordance to the conceptual layout to the user, wherein the source model and the conceptual model are juxtaposed.

24. The system of claim 23, wherein the steps further comprise:

modifying at least one of the conceptual layout and the source layout; and storing the modified layout.

25. The system of claim 23, wherein the steps further comprise:

creating a target layout for the target model;

displaying the conceptual model in accordance to the conceptual layout; and displaying the target model to the user in accordance to the target layout, wherein the conceptual model and the target model are juxtaposed.

26. The system of claim 20, wherein the steps further comprise:

providing a list of unmapped attributes in the conceptual model to a user; and providing an indication to the user that an attribute in the list of unmapped attributes does not need to be mapped.

27. The system of claim 26, wherein the steps further comprise:

providing a list of unmapped target attributes in the target model to the user; and providing an indication to the user that a target attribute in the list of unmapped target attributes does not need to be mapped.

* * * * *